C. S. Snead,
Skylight.
No. 112,644. Patented Mar. 14, 1871.
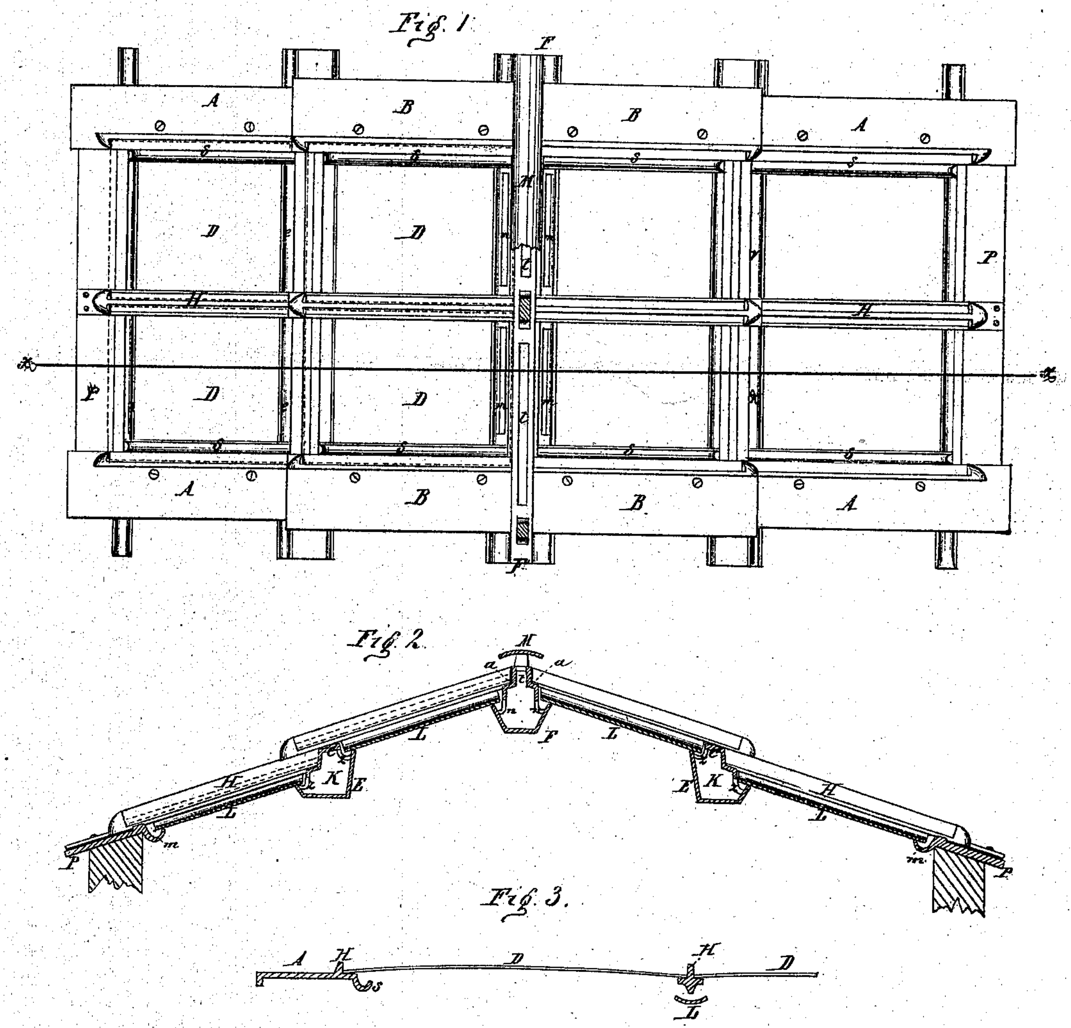
Witnesses:
H. A. Dretz
C. A. Pettit
Inventor:
Chas. S. Snead
Per Munn & Co
Attorneys
N. PETERS, PHOTO-LITHOGRAPHER, WASHINGTON, D. C.

UNITED STATES PATENT OFFICE.

CHARLES SCOTT SNEAD, OF LOUISVILLE, KENTUCKY.

IMPROVEMENT IN SKY-LIGHTS.

Specification forming part of Letters Patent No. 112,644, dated March 14, 1871.

I, CHARLES SCOTT SNEAD, of the city of Louisville, county of Jefferson, and State of Kentucky, have invented certain Improvements in the Construction of Sky-Lights, of which the following is a specification:

Referring to the drawing, Figure 1 represents a top or plan view of my improved sky-light, and Fig. 2 a longitudinal section of the same, taken through the line *x x* of Fig. 1. Fig. 3 is a cross-section of a part of the sky-light, including one of the barge-plates.

My invention pertains to sky-lights; and consists in a certain construction and arrangement of parts, whereby free circulation of air is permitted, and water from condensation or leakage conducted off without liability of entering the building, as hereinafter described.

I form the frame of my sky-light of metal, preferably of iron.

I have represented in the drawing a sky-light of what is known as the "gable" form; but my invention may be applied to half-gable, shed, or round roofs equally well.

In any case I curve or incline the ridge-pole and purlins slightly from the center, so that water accumulating from condensation or otherwise may be conducted off.

I have also shown the sky-light provided with eight lights of glass; but both the number and form of the same may be varied according to the requirements of each particular case.

The ridge-pole F is made hollow and with side perforations *m m*, and longitudinal openings *t* in its top or upper side. It is provided with rabbets or inclined shoulders *a a*, for the glass to rest on, and its bottom forms a gutter. The cover M prevents entrance of water, but is placed a short distance above the ridge-pole, so as to permit free circulation of air through spaces *t* and *m*.

The purlins E are similar to the ridge-pole in their general features of form or construction, having shoulders or rests *c*, for supporting the glass D, and perforations *z z* in the side and top for passage of air. Their lower edges form gutters *v*, for conducting water into the space *k*, and suitable recesses are formed to receive the upper ends of the lower sash-bars, H.

L is a gutter placed under each sash-bar to conduct any water, from leakage or condensation, into the gutters *z* in the purlins E, or the gutters *w* in the eave-plates P.

Gutters *s s* are formed along the inner edge of the barge-plates for a similar purpose.

The glass D may be secured in place by cement or other preferred means.

The hollow and perforated ridge-pole and purlins allow a free circulation of air, thereby causing the air in the building to condense for the most part before it strikes the glass; and should this circulation be from any cause imperfect, the water accumulating from condensation, as well as that from leakage, will be carried off in the gutters.

The parts are also so constructed and arranged as to prevent the entrance of water during storms, even when driven forcibly against the roof.

I claim as new and desire to protect by Letters Patent—

1. The combination of the raised cover M with the hollow ridge-pole F, provided with perforations *m* and *t* in its sides and top, and with shoulders *a*, substantially as and for the purpose specified.

2. The combination of the ridge-pole F, provided with the cover M and perforations *m t*, the purlin E, gutters L, barge-plates A B *s*, and eave-plates P *w*, substantially as herein shown and described.

CHAS. S. SNEAD.

Witnesses:
WM. S. BODLEY,
JNO. G. SIMRALL.